United States Patent [19]
Lee

[11] Patent Number: 5,381,280
[45] Date of Patent: Jan. 10, 1995

[54] MAGNETIC RECORDING AND REPRODUCING APPARATUS FOR RECORDING AND REPRODUCING IN BOTH ANALOG AND DIGITAL MODES

[75] Inventor: Min-su Lee, Suwon, Rep. of Korea

[73] Assignee: Samsung Electronics Co., Ltd., Kyungki, Rep. of Korea

[21] Appl. No.: 21,173

[22] Filed: Feb. 16, 1993

[30] Foreign Application Priority Data

Feb. 15, 1992 [KR] Rep. of Korea ............ 92-2235

[51] Int. Cl.6 .................................. G11B 5/02
[52] U.S. Cl. .......................... 360/75; 360/64; 360/69
[58] Field of Search .................. 360/69, 75, 64

[56] References Cited

U.S. PATENT DOCUMENTS

| | | | |
|---|---|---|---|
| 4,688,115 | 8/1987 | Takahashi et al. | 360/70 |
| 4,809,095 | 2/1989 | Ushiro | 360/75 |
| 4,811,122 | 3/1989 | Kido et al. | 360/69 X |
| 5,107,380 | 4/1992 | Fujiki et al. | 360/69 |
| 5,255,140 | 10/1993 | Yoon | 360/75 X |
| 5,291,342 | 3/1994 | Kim | 360/69 X |

*Primary Examiner*—Andrew L. Sniezek
*Assistant Examiner*—James L. Habermehl
*Attorney, Agent, or Firm*—Sughrue, Mion, Zinn, Macpeak & Seas

[57] ABSTRACT

A magnetic recording and reproducing apparatus for selectively recording and reproducing information on either an analog signal magnetic tape or a digital signal magnetic tape. A head drum is provided with both analog signal heads and digital signal heads, and a signal current is selectively applied to each head depending on the type of tape loaded in the apparatus. When an analog signal magnetic tape is loaded, the head drum is rotated in the direction corresponding to the direction of tape travel. When a digital signal magnetic tape is loaded, the head drum is rotated in the direction opposing the direction of tape travel.

6 Claims, 3 Drawing Sheets

FIG.3 (PRIOR ART)
FIG.4
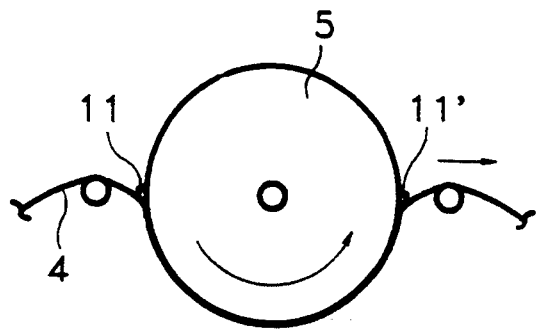
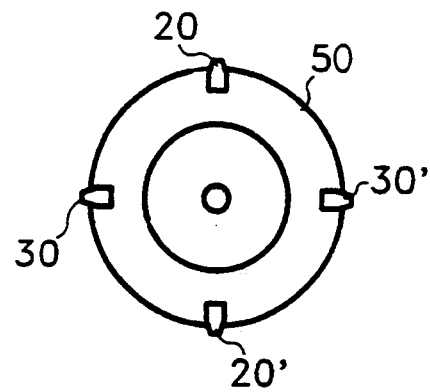
FIG.5A
FIG.5B
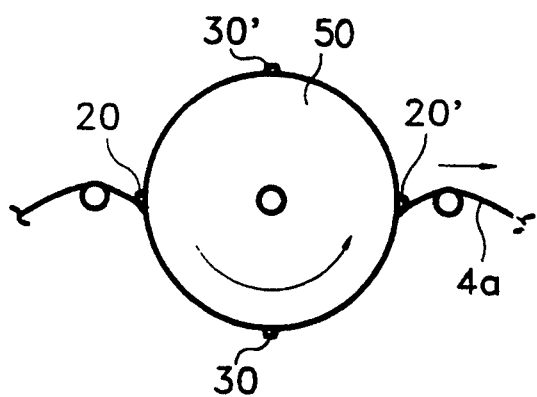
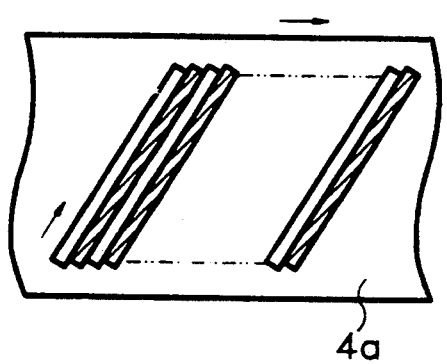
FIG.6A
FIG.6B
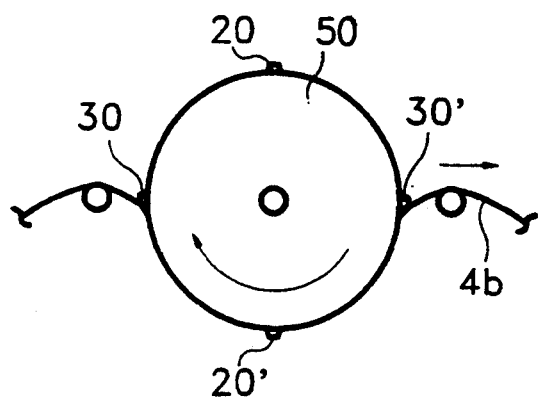
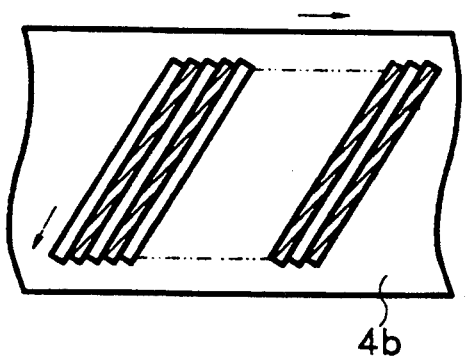

MAGNETIC RECORDING AND REPRODUCING APPARATUS FOR RECORDING AND REPRODUCING IN BOTH ANALOG AND DIGITAL MODES

BACKGROUND OF THE INVENTION

1. Field of the Invention

The present invention relates to a magnetic recording and reproducing apparatus for recording and reproducing a signal on a magnetic tape using a rotating magnetic head. In particular, the invention is an improved magnetic recording and reproducing apparatus which can utilize recording media recorded in either analog or digital form.

The present disclosure is based on the disclosure of Korean Application No. 92-2235 filed Feb. 15, 1992, which disclosure is incorporated herein by reference.

2. Description of the Related Art

In general, a magnetic tape has a tape format whereby a video signal track or audio signal track is formed diagonally across an area thereof. Such a magnetic tape is utilized in the magnetic recording and reproducing apparatus of a video tape recorder or audio tape recorder having a rotating head drum for reading information from, or writing information to, the tape.

The basic elements of the above-mentioned type of magnetic recording and reproducing apparatus employing a magnetic tape 4 are shown in FIG. 1. The recording format of magnetic tape 4 is schematically shown in FIG. 2. Such a magnetic recording and reproducing apparatus comprises reel disks 1 and 2 for receiving a tape cassette (not shown) and guide poles 3 and 3' for drawing tape 4 from the cassette toward the rotating head drum 5. Also, a full erasing head 6, for erasing the recorded information from the entire width of tape 4, an audio erasing head 7, for erasing the audio information recorded within an audio track 7', and a video erasing head 8, for erasing the video information recorded within a video track 8', are provided along the path of tape 4. Also, a pinch roller 9 and capstan shaft 10 are installed for pressing and conveying tape 4 therebetween. Two magnetic heads 11 and 11' are provided on opposite sides of rotating head drum 5 as shown in FIG. 3.

The magnetic recording and reproducing apparatus discussed above conveys tape 4 by pressing the tape between pinch roller 9 and capstan shaft 10 and by pressing the tape against the outer circumferential surface of rotating head drum 5. At this time, magnetic heads 11 and 11' alternately scan a first track 4a and a second track 4b which are recorded in a helical manner on magnetic tape 4, so as to record information or reproduce recorded information (see FIG. 2). Erasing heads 6, 7 and 8 can be selectively activated in a known manner when recording. Rotating head drum 5 is slanted with respect to the traveling direction of tape 4 so that magnetic heads 11 and 11' will record to and reproduce from helical tracks 4a and 4b.

Such a magnetic recording and reproducing apparatus records and reproduces the recorded signal using an analog signal magnetic tape 4 in which the information is recorded by alternating the magnetization direction according to the wave shape of the recording current flowing onto the magnetic heads 11 and 11'. The recording and reproducing apparatus as explained above cannot use a digital magnetic tape.

SUMMARY OF THE INVENTION

An object of the present invention is to provide a magnetic recording and reproducing apparatus which can selectively record and reproduce information using an analog signal magnetic tape or a digital signal magnetic tape.

To accomplish the above object, there is provided a magnetic recording and reproducing apparatus for recording and reproducing information by rotating a head drum over a magnetic tape. The head drum is provided with an analog signal head and a digital signal head, and in response to the presence or absence of a current applied to either head, a magnetic tape for an analog signal and a magnetic tape for a digital signal can be selectively recorded and reproduced.

The present invention is characterized in that, when an analog signal magnetic tape is employed in the apparatus, the head drum is rotated in one direction and the analog signal head is activated. Accordingly, an analog magnetic tape has its data recorded and reproduced by an analog signal head. Further, when a digital signal magnetic tape is employed in the apparatus, the head drum is rotated in the opposite direction and the digital signal head is activated. Accordingly, a digital signal magnetic tape has its data recorded and reproduced by the digital signal head.

BRIEF DESCRIPTION OF THE DRAWINGS

The above objects and other advantages of the present invention will become more apparent by describing in detail a preferred embodiment thereof with reference to the attached drawings in which:

FIG. 3 illustrates a conventional head drum which can be applied to the apparatus shown in FIG. 1;

FIG. 4 illustrates a head drum according to a preferred embodiment of the present invention;

FIG. 5A illustrates an analog signal magnetic tape pressed against the head drum of the preferred embodiment;

FIG. 5B illustrates the format of the tape of FIG. 5A;

FIG. 6A illustrates a digital signal magnetic tape pressed against the head drum of the preferred embodiment;

FIG. 6B illustrates the format of the tape of FIG. 6A; and

DETAILED DESCRIPTION OF THE PREFERRED EMBODIMENT

Figure 1:
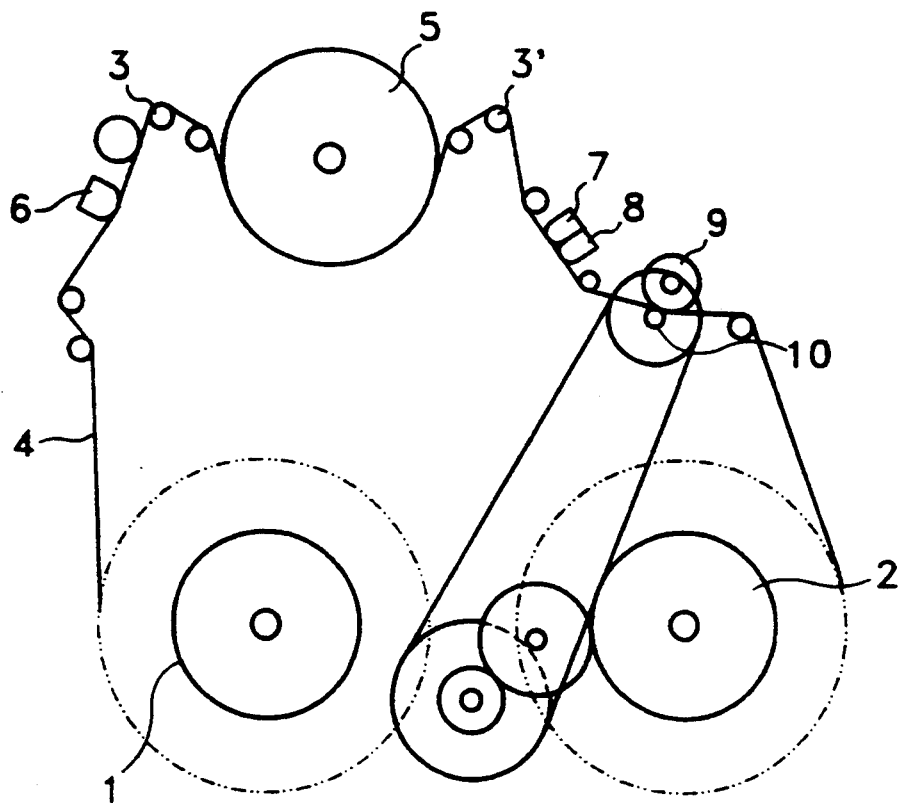
FIG. 1 illustrates a conventional magnetic recording and reproducing apparatus.
Figure 2:
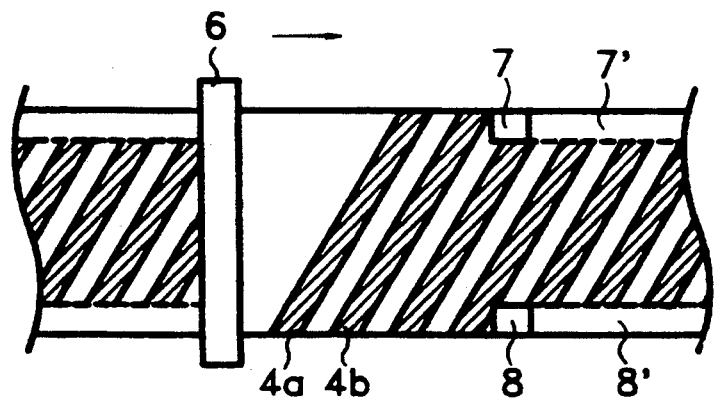
FIG. 2 illustrates a conventional tape format of a magnetic tape employed in the apparatus of FIG. 1.
Figure 7:
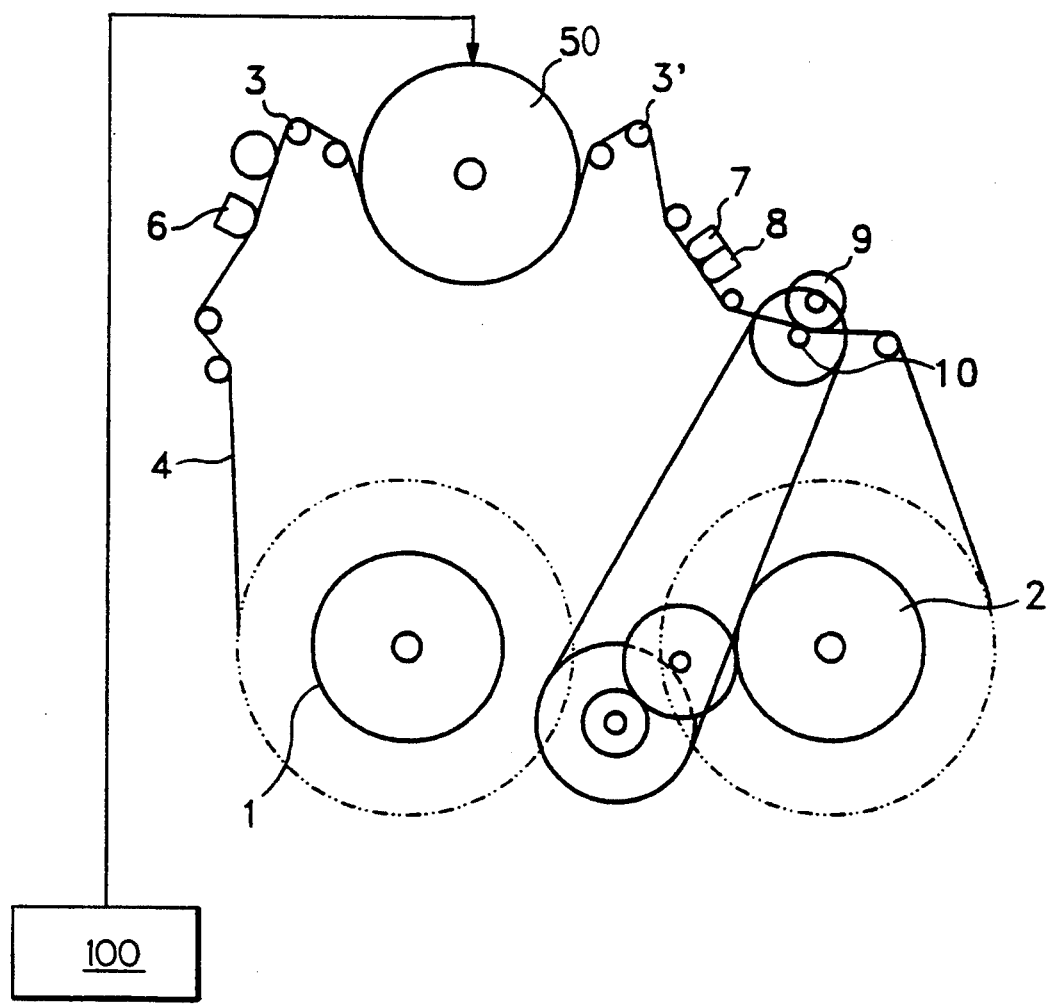
FIG. 7 illustrates a magnetic recording and reproducing apparatus of the preferred embodiment.

The magnetic recording and reproducing apparatus according to the preferred embodiment of the invention is illustrated in FIG. 7 and has several components in common with the conventional device shown in FIG. 1. Reel disks 1 and 2 support a tape cassette (not shown) thereon, and guide poles 3 and 3' draw tape 4 from the cassette. Also, a full erasing head 6 for erasing the recorded information from the entire width of tape 4, an audio erasing head 7 for erasing the video information recorded within an audio erasing track 7', and a video erasing head 8 for erasing the video information recorded within control track 8', are provided along the path of the tape. A pinch roller 9 and a capstan shaft 10 are installed for conveying the tape 4. The rotating axis of rotating head drum 50 is also tilted with respect to the direction of travel of tape 4. However, rotating head drum 50 of the preferred embodiment differs from rotating head drum 5 of the conventional device in the manner described below.

In the preferred embodiments of the present invention, head drum 50 is equipped with analog signal heads 20 and 20' and digital signal heads 30 and 30' as shown in FIG. 4. These heads 20 & 20' and 30 and 30' are each positioned so as to be 180° from a corresponding head on head drum 50.

The above-constructed magnetic recording and reproducing apparatus can utilize analog signal magnetic tape 4a as shown in FIG. 5A. In such a case, tape 4a is pressed against and conveyed by pinch roller 9 and capstan shaft 10, and passed along the outer circumferential surface of rotating head drum 50. At this point, only analog signal heads 20 and 20' of rotating head drum 5 are supplied with a signal current, from controller 100, and rotating head drum 50 rotates counterclockwise, which is the same as the direction of travel of tape 4a. Accordingly, the tape format of analog signal tape 4a is established as being from the bottom to the top of the tape, as shown in FIG. 5B, due to the tilted axis of rotation of rotating head drum 50 and the counter-clockwise rotation thereof.

Referring to FIG. 6A, when the magnetic recording and reproducing apparatus utilizes digital signal magnetic tape 4b, only digital signal heads 30 and 30' of rotating head drum 50 are supplied with a signal current from controller 100, and rotating head drum 5 rotates in a clockwise direction, which is opposite the direction of travel of the tape 4b. Therefore, the tape format of digital signal magnetic tape 4b is established as being from the top to the bottom of the tape, as shown in FIG. 6B.

Consequently, when analog signal magnetic tape 4a is utilized in the magnetic recording and reproducing apparatus, the information is recorded and reproduced by analog signal heads 20 and 20' and when digital signal tape 4b is utilized, the information is recorded and reproduced by digital signal heads 30 and 30'.

It should be noted that the density of data recorded on digital signal magnetic tape 4b is ordinarily higher than that of analog signal magnetic tape 4a. Accordingly, when the information is recorded on and reproduced from a digital signal magnetic tape, the requirements concerning the stability of the tape's conveyance become more stringent than for an analog signal magnetic tape. In the preferred embodiment, when the magnetic recording and reproducing apparatus utilizes digital signal magnetic tape 4b, the necessary tape tension for tape conveying stability is provided by rotating the head drum 50 in the opposite direction from that of the travel of the tape. On the other hand, rotating head drum 50 can be driven to rotate in either direction irrespective of the use analog signal magnetic tape 4a or digital signal magnetic tape 4b. Of course, other methods for tensioning the tape can be employed.

As described above, a magnetic recording and reproducing apparatus of the present invention can selectively utilize an analog signal magnetic tape or a digital signal magnetic tape, so that recording and reproducing thereof can be accomplished by a single apparatus.

Controller 100 of the invention can be a microprocessor based device, or the like and can be programmed as needed to control all of the operations of the recording and reproducing apparatus. Also, the type of tape utilized can be selected manually by the operator or automatically in response to a signal from a sensor in the recording and reproducing apparatus.

The invention has been described through a preferred embodiment. However, it will be apparent to those skilled in the art that various modifications can be made without departing from the scope of the invention as defined by the appended claims.

What is claimed is:

1. A magnetic recording and reproducing apparatus for recording information on a magnetic tape and for reproducing information recorded on the magnetic tape, said apparatus comprising:
   a rotating head drum having at least one analog signal head and at least one digital signal head mounted on an outer surface thereof;
   control means for selectively activating one of said analog and digital signal heads and causing said rotating head drum to rotate in a first direction when said at least one analog signal head is activated and a second direction when said at least one digital signal head is activated.

2. An apparatus as claimed in claim 1 wherein said first direction corresponds to a direction of travel of said tape and said second direction opposes said direction of travel of said tape.

3. An apparatus as claimed in claim 2 wherein an axis of rotation of said rotating head is inclined with respect to said direction of travel of said tape.

4. A magnetic recording and reproducing apparatus for recording information on a magnetic tape and for reproducing information recorded on the magnetic tape, said apparatus comprising:
   a rotating head drum having a cylindrical outer surface;
   two analog signal heads and two digital signal heads mounted on said cylindrical outer surface, one of said two analog signal heads being mounted in diametric opposition to the other of said analog signal heads and one of said two digital signal heads being mounted in diametric opposition to the other of said digital signal heads;
   control means for selectively activating one of said analog and digital signal heads and causing said rotating head drum to rotate in a first direction when said analog signal heads are activated and a second direction when said digital signal heads are activated.

5. An apparatus as claimed in claim 4 wherein said first direction corresponds to a direction of travel of said tape and said second direction opposes said direction of travel of said tape.

6. An apparatus as claimed in claim 5 wherein an axis of rotation of said rotating head drum is inclined with respect to said direction of travel of said tape.

* * * * *